April 20, 1943.  V. S. KUCKI  2,317,068
LIQUID MEASURING DEVICE
Original Filed April 10, 1939
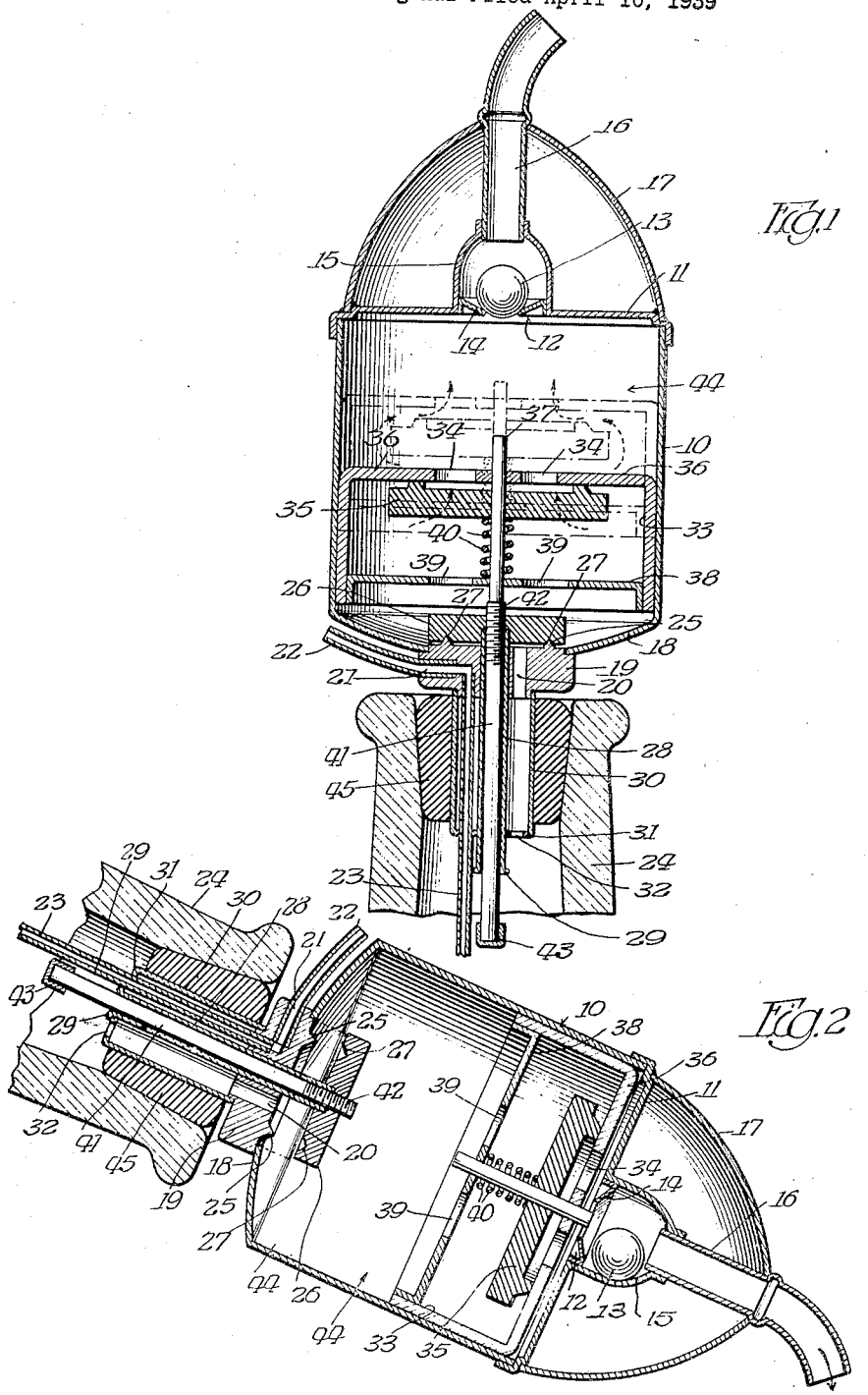
Inventor,
Vincent S. Kucki Patented Apr. 20, 1943

2,317,068

UNITED STATES PATENT OFFICE 2,317,068

LIQUID MEASURING DEVICE

Vincent S. Kucki, Chicago, Ill.

Substituted for abandoned application Serial No. 266,973, April 10, 1939. This application June 24, 1941, Serial No. 399,519

12 Claims. (Cl. 221—98)

This invention relates to improvements in measuring devices for measuring liquids, particularly adapted though not necessarily limited in use with dispensing containers, such as bottles and the like, for measuring predetermined quantities of the liquid to be dispensed, and one of the objects of the invention is to provide an improved device of this character adapted to be readily applied to a bottle or the like for the purpose of permitting only a predetermined amount of liquid to be removed from the bottle upon each inversion of the bottle, and to seal the bottle to prevent any liquid beyond such predetermined quantity from being dispensed at any one time.

A further object is to provide in a device of this character means whereby the quantity of liquid to be dispensed at any one time may be varied at the will of the user.

A further object is to provide improved means whereby the operation of said device will be automatic.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which:

Figure 1 is a longitudinal sectional view of a device of this character constructed in accordance with the principles of this invention and showing the same applied to a bottle and in an upright position, a portion of the neck of the bottle being shown in section.

Figure 2 is a view similar to Figure 1 showing the position the parts will assume when liquid is being discharged therefrom.

Referring more particularly to the drawing, the numeral 10 designates a casing which may be of any desired size and configuration and constructed of any suitable material and which casing is adapted to be attached to a liquid supply holder or container.

At one end of the casing is a wall 11 having an opening 12 therethrough constituting a discharge outlet and this opening is adapted to be closed by means of a suitable valve 13 preferably in the form of a ball which is adapted to rest upon a valve seat 14. The valve 13 is enclosed in a housing 15 and leading from the housing is a discharge or outlet tube or pipe 16. A cap or end structure 17 may be provided, if desired, and may be of any desired configuration to encase the housing 15 and a portion of the discharge tube 16.

The wall 18 at the other end of the casing 10 is provided with an opening having inserted therein a member 19 which may be constructed of any suitable material and held in position in any suitable manner. Through this member 19 is an opening 20 for the purpose of admitting liquid into the casing.

The member 19 is also provided with another opening 21 to which may be connected a tube 22 and also a tube 23, the former being open to the atmosphere and the latter extending into the container 24 for any desired distance so as to permit air to enter the container and thereby permit the liquid to be poured from the container.

Encompassing the opening 20 in the member 19 and within the casing 10 is a tapered flange or projection 25 constituting a seat for the valve member 26 which is provided in its face with an annular groove 27 and into which groove the flange or projection 25 extends when the casing 10 is held uprightly and the valve 26 is seated to close the opening 20.

Secured to the valve member 26 is a tubular member 28 which extends through the member 19 for any suitable distance and projects into the container 24.

This member 28 loosely slides through the member 29 when the valve 26 is moved in the casing 10 and the extremity of the member 28 is preferably shaped, as at 29, to form a finger grip for a purpose to be described.

The tubular member 28 serves as a guide for the movement of the valve 26. Secured to and depending from the member 19 is a tubular member 30 the bottom thereof being preferably closed by an end wall 31 provided with any desired or suitable number of openings 32 therethrough. The opening 20 in the member 19 has communication with the interior of the tubular member 30 and the member 30 encompasses the tubular member 28 as well as the tube 23.

Within the casing 10 is arranged a freely movable piston 33 having any desired number of openings 34 therethrough. The piston is preferably hollow and within the piston is arranged a valve 35 which is adapted to seat against the end wall 36 of the piston to close the openings 34.

A piston rod 37 is secured to the valve 35 and projects loosely through the end wall 36 of the piston and is also movable freely through a guide 38 within the piston. This guide may, if desired, be in the form of a disc provided with openings 39 therethrough.

The piston rod 37 projects for any desired distance above and below the piston 35 and a spring 40 encompasses the piston rod with one end abutting the valve 35 and the other end abutting the guide 39, and tends normally to move the valve 35 in a direction to close the openings 34.

Threaded in the valve member 26 and by one end is a rod 41 the end 42 of which is adapted to be projected for any desired distance beyond the valve 26 and be withdrawn, by gripping the end 29 of the tubular member 28 with one hand and by turning the rod 41 with respect to the member 28 by gripping the extremity 43 of the rod.

This rod 41 is provided for the purpose of limiting the movement of the piston 33 in one direction so as to vary at will the space designated generally by the reference numeral 44 on the discharge side of the piston and thereby vary the amount of liquid which is to be discharged through the discharge outlet pipe or nozzle 16 when the casing 10 is inverted.

The casing 10 is supported by means of a cork or closure 45 which is adapted to be inserted into the neck of the bottle or container 24. In use the parts will be in their normal positions when the casing 10 is held uprightly as shown in Figure 1. That is, the valve 13 will be closed to prevent the evaporation of any liquid in the space 44, the piston 33 will be at its lowermost limit with the end of the piston rod 37 contacting the end of the rod 41. In this position the spring 40 as well as the rod 41 and piston rod 37 assist in holding the valve 35 closed.

The valve 26 will also be closed.

When the casing is inverted or tilted, as shown in Figure 2, so as to dispense the liquid, it is first necessary to fill the space 44 with the quantity of liquid to be discharged. The size of this space as before stated is controlled by the adjustment of the rod 31 with respect to the valve 26.

As the casing 10 and container 24 are tilted to the position shown in Figure 2, the pressure of the liquid in the container 24 flowing through the opening 32 in the tubular member 30 and opening 29 against the valve 26 will unseat the latter if it is not unseated by gravity. The spring 40, however, during this operation will hold the valve 35 in a position to close the openings 34. As the liquid enters the casing 10 it will move the piston 33 toward the discharge outlet end of the casing and liquid will continue to flow into the casing 10 until the movement of the piston 33 is arrested.

The casing 10 and the container 24 are then turned back to the position shown in Figure 1 at which time the valve 26 will gravitate and close the opening 29 to prevent the liquid from flowing back through the opening 29 into the container 24. The valve 35 and the piston 33 will then gravitate but, as the valve 35 is of a weight heavier than the piston 33 the valve 35 will move in advance of the piston 33 and against the stress of the spring 40, thereby opening the passages 34 to permit the liquid to flow therethrough and into the space 44.

As soon as the valve 35 has assumed a position that the end of the piston rod 37 contacts the end of the rod 41, the movement of the valve 35 will be arrested and as the piston 33 continues to gravitate it will be arrested in its movement when the wall 36 contacts the valve 35, thereby closing the openings 34, the spring 40 operating to hold the valve 35 in such a closing position.

The quantity of liquid to be discharged upon the next inversion of the bottle 10 will then be contained in the space 44.

Upon the next inversion of the casing 10 the quantity of liquid in the space 44 will be discharged through the discharge nozzle or pipe 16 and as liquid will then flow from the container 44 through the opening 29, the pressure of this incoming liquid will operate upon the piston 33 to move it in a direction toward the discharge outlet opening 12 and this will assist in forcoing from the space 44 the liquid contained therein, while the valve 35 will prevent any additional liquid from being delivered into the space 44 until the casing 10 is again turned into an upright position.

Thus it will be seen that only a predetermined quantity of liquid can be discharged upon each inversion of the casing 10 and this quantity may be varied by varying the size of the space 44.

This variation of the size of the space 44 is accommplished by holding the tubular member 28 against rotation or by gripping the end 29 thereof and by rotating the rod 41 by the end 43 so as to position the extremity 42 for any desired distance beyond the valve 26.

While the preferred form of the invention has been herein shown and described, it is to be understood that various changes may be made in the details of construction and in the combination and arrangement of the several parts, within the scope of the claims without departing from the spirit of this invention.

What is claimed as new is:

1. In a liquid measuring device for combination with a liquid supply container, a casing having means whereby it may be attached to the container, said casing having a liquid supply inlet and a discharge outlet, valve means for controlling said outlet, means for controlling said inlet, a freely movable piston in said casing, there being an opening through said piston whereby liquid on one side thereof will pass to the other side, and a valve device for controlling the opening in the piston, the last said valve device being movable with the piston when the latter is moved in one direction to close and maintain the opening in the piston closed, and movable independently of the piston in the same direction with and in advance of the piston when the piston is moving in the opposite direction, whereby to permit liquid to flow through the opening in the piston to the other side thereof.

2. In a liquid measuring device for combination with a liquid supply container, a casing having means whereby it may be attached to the container, said casing having a liquid supply inlet and a discharge outlet, valve means for controlling said outlet, means for controlling said inlet, a freely movable piston in said casing, there being an opening through said piston whereby liquid on one side thereof will pass to the other side, a valve device for controlling the opening in the piston, the last said valve device being movable with the piston when the latter is moved in one direction to close and maintain the opening in the piston closed, and movable independently of the piston in the same direction with and in advance of the piston when the piston is moving in the opposite direction, whereby to permit liquid to flow through the opening in the piston to the other side thereof, and means adapted to be set at will for varying the extent of movement of said piston.

3. In a liquid measuring device for combination with a liquid supply container, a casing having means whereby it may be attached to the container, said casing having a liquid supply inlet and a discharge outlet, valve means for controlling said outlet, means for controlling said inlet, a freely movable piston in said casing, there being an opening through said piston whereby liquid on one side thereof will pass to the other side, a valve device for controlling the opening in the piston, the last said valve device being movable with the piston when the latter is moved in one direction to close and maintain the opening in the piston closed, and movable independently of the piston in the same direction with and in advance of the piston when the piston is moving in the opposite direction, whereby to permit liquid to flow through the opening in the piston to the other side thereof, and means for varying at will the area of the liquid containing space on that side of the piston adjacent which the outlet of the said casing is located.

4. In a liquid measuring device for combination with a liquid supply container, a casing having means whereby it may be attached to the container, said casing having a liquid supply inlet and a discharge outlet, valve means for controlling said outlet, means for controlling said inlet, a freely movable piston in said casing, there being an opening through said piston whereby liquid on one side thereof will pass to the other side, a valve device for controlling the opening in the piston, the last said valve device being movable with the piston when the latter is moved in one direction to close and maintain the opening in the piston closed, and movable independently of the piston in the same direction with and in advance of the piston when the piston is moving in the opposite direction, whereby to permit liquid to flow through the opening in the piston to the other side thereof, means for varying the extent of movement of said piston, the last recited means embodying an adjustable stop for the piston, and means whereby said stop may be adjusted from the outside of said casing.

5. In a liquid measuring device for combination with a liquid supply container, a casing having means whereby it may be attached to the container, said casing having an inlet and a discharge outlet, valve means for controlling said outlet, a valve for controlling said inlet, a freely movable piston within the casing and provided with a liquid passage opening therethrough, a valve for controlling said passage, and means tending normally to cause the last said valve to close said passage in the piston, said piston and the last said valve being movable in one direction by fluid entering the casing through said inlet when the casing is tilted, said piston and the last said valve gravitating in the casing when the latter is held in an erect position, the last said valve moving in advance of the piston to open the said passage through the piston to permit the liquid in the casing below the piston to pass to the other side of the piston.

6. In a liquid measuring device for combination with a liquid supply container, a casing having means whereby it may be attached to the container, said casing having an inlet and a discharge outlet, valve means for controlling said outlet, a valve for controlling said inlet, a freely movable piston within the casing and provided with a liquid passage opening therethrough, a valve for controlling said passage, means tending normally to cause the last said valve to close said passage in the piston, said piston and the last said valve being movable in one direction by fluid entering the casing through said inlet when the casing is tilted, said piston and the last said valve gravitating in the casing when the latter is held in an erect position, the last said valve moving in advance of the piston to open the said passage through the piston to permit the liquid in the casing below the piston to pass to the other side of the piston, and an adjustable stop for limiting the movement of the piston in one direction, whereby the quantity of liquid to be discharged from said casing may be varied at will.

7. In a liquid measuring device for combination with a liquid supply container, a casing having means whereby it may be attached to the container, said casing having an inlet and a discharge outlet, valve means for controlling said outlet, a valve for controlling said inlet, a freely movable piston within the casing and provided with a liquid passage opening therethrough, a valve for controlling said passage, means tending normally to cause the last said valve to close said passage in the piston, said piston and the last said valve being movable in one direction by fluid entering the casing through said inlet when the casing is tilted, said piston and the last said valve gravitating in the casing when the latter is held in an erect position, the last said passage through the piston to permit the liquid in the casing below the piston to pass to the other side of the piston, an adjustable stop for limiting the movement of the piston in one direction, whereby the quantity of liquid to be discharged from said casing may be varied at will, said stop embodying a member adjustably connected with the inlet controlling valve, and a tubular member secured to said inlet controlling valve and through which tubular member the last said member passes, both of the last two said members being accessible from the outside of said casing.

8. In a liquid measuring device for combination with a liquid supply container, a casing having means whereby it may be attached to the container, said casing having a liquid supply inlet and a discharge outlet, valve means for controlling said outlet, means for controlling said inlet, a freely movable piston in said casing, there being an opening through said piston whereby liquid on one side thereof will pass to the other side, a valve device for controlling the opening in the piston, the last said valve device being movable with the piston when the latter is moved in one direction to close and maintain the opening in the piston closed, and movable independently of the piston in the same direction with and in advance of the piston when the piston is moving in the opposite direction, whereby to permit liquid to flow through the opening in the piston to the other side thereof, and an air inlet passage whereby air may be admitted into the supply container when said casing is attached thereto.

9. In a liquid measuring device for combination with a liquid supply container, a casing having means whereby it may be attached to a liquid supply container, said casing having a discharge outlet and an inlet, a freely movable piston in the casing, said piston adapted to be bodily moved in the casing towards the said outlet to discharge the liquid which is on the discharge side of the piston by the entrance of fluid into the casing through said inlet when the casing is tilted, said piston gravitating in the casing towards the inlet opening when the casing is subsequently held erect, and means operating to permit the liquid on the under side of the piston to flow to the opposite or discharge side of the piston as the piston gravitates.

10. In a liquid measuring device for combination with a liquid supply container, a casing having means whereby it may be attached to a liquid supply container, said casing having a discharge outlet and an inlet, a freely movable piston in the casing, said piston adapted to be bodily moved in the casing towards the said outlet to discharge the liquid which is on the discharge side of the piston by the entrance of fluid into the casing through said inlet when the casing is tilted, said piston gravitating in the casing towards the inlet opening when the casing is subsequently held erect, means operating to permit the liquid on the under side of the piston to flow to the opposite or discharge side of the piston as the piston gravitates, and means for varying at will the amount of liquid discharged from said casing.

11. In a liquid measuring device for combination with a liquid supply container, a casing having means whereby it may be attached to a liquid supply container, said casing having a discharge outlet and an inlet, a freely movable piston in the casing, said piston adapted to be bodily moved in the casing towards the said outlet to discharge the liquid which is on the discharge side of the piston by the entrance of fluid into the casing through said inlet when the casing is tilted, said piston gravitating in the casing towards the inlet opening when the casing is subsequently held erect, means operating to permit the liquid on the underside of the piston to flow to the opposite or discharge side of the piston as the piston gravitates, and an adjustable stop for limiting the movement of the piston in one direction, whereby the quantity of liquid discharged from said casing upon each operation of the device may be varied.

12. In a liquid measuring device for combination with a liquid supply container, a casing having means whereby it may be attached to a liquid supply container, said casing having a discharge outlet and an inlet, a freely movable piston in the casing, said piston adapted to be bodily moved in the casing towards the said outlet to discharge the liquid which is on the discharge side of the piston by the entrance of fluid into the casing through said inlet when the casing is tilted, said piston gravitating in the casing towards the inlet opening when the casing is subsequently held erect, means operating to permit the liquid on the under side of the piston to flow to the opposite or discharge side of the piston as the piston gravitates, and an adjustable stop for limiting the movement of the piston in one direction, whereby the quantity of liquid discharged from said casing upon each operation of the device may be varied, the said adjustable stop being accessible from the outside of said casing.

VINCENT S. KUCKI.